United States Patent Office 3,454,679
Patented July 8, 1969

3,454,679
SULFENYL AND SULFINYL PHOSPHORYL
DICHLORIDES
Paul C. Aichenegg, Prairie Village, Kans., and Lawrence
Edward Gillen, Kansas City, Mo., assignors to Chemagro
Corporation, New York, N.Y., a corporation of New
York
No Drawing. Filed May 26, 1966, Ser. No. 553,022
Int. Cl. C07f 9/02; A01n 9/36
U.S. Cl. 260—934                                12 Claims

ABSTRACT OF THE DISCLOSURE

Compounds of the formula

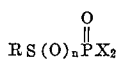

are prepared where R is trihaloethyl or diahalovinyl, X is halogen, all halogens are chlorine or bromine, and $n$ is 0 or 1. The compounds are useful as insecticides, fungicides or nematocides or to prepare phosphates or thiophosphates of the formulae

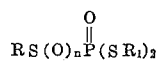

and

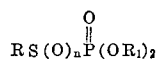

The present invention relates to the preparation of compounds having the formula

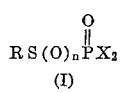
(I)

where R is trihaloethyl or dihalovinyl, the halogen atoms having an atomic weight of 35 to 80, $n$ is zero or 1 and X is halogen of atomic weight 35 to 80. Preferably, all halogen atoms are chlorine.

These compounds are useful as insecticides, fungicides and nematocides but are primarily useful as intermediates to prepare other compounds such as those having the formulae

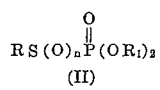
(II)

and

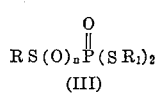
(III)

where R and $n$ are as defined previously and $R_1$ is hydrocarbon (preferably alkyl of 1 to 6 carbon atoms, phenyl or tolyl), haloaryl, haloalkyl, nitrophenyl or alkoxyphenyl. The two $R_1$ groups can be the same or different or can be joined to form a ring with the sulfur and phosphorus atoms.

It is an object of the present invention to prepare novel sulfenyl phosphoryl dichlorides.

Another object is to prepare novel sulfinyl phosphoryl dichlorides.

A further object is to prepare novel phosphorus compounds.

An additional object is to prepare novel fungicides and nematocides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects can be attained by preparing compounds having the formula

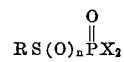

as set forth supra.

The sulfenyl phosphoryl dichlorides and bromides of the present invention are prepared by reacting a sulfenyl chloride or bromide of the formula RSCl or RSBr with an equimolar amount of a compound having the formula $R_2OPX_2$ where $R_2$ is alkyl and X is chlorine or bromine. The trichloroethyl sulfinyl phosphoryl dichlorides are prepared by oxidizing the corresponding trichloroethyl sulfenyl phosphoryl dichlorides, preferably using ozone as the oxidizing medium. This method, however, did not work to prepare the dichlorovinyl sulfinyl phosphoryl dichlorides. Instead, they were prepared by dehydrochlorination of the corresponding trichloroethyl sulfenyl phosphoryl dichloride in the presence of a tertiary amine base. Contrary to expectations, the reaction did not go when using one mole of base per mole of sulfenyl phosphoryl dichloride. Instead, at least three moles of base were required per mole of sulfenyl phosphoryl dichloride in order for the reaction to go. More tertiary base, e.g. 5 or 6 moles can be used but there is no advantage in doing so.

The reaction is specific to the preparation of sulfenyl phosphoryl dichlorides and sulfinyl phosphoryl dichlorides since the corresponding thiono analogues (P=S) could not be obtained.

Many of the compounds within Formula II when $n$ is zero are old per se, see Hensel et al. Patent No. 3,184,377. The new compounds within Formula II as well as the new compounds within Formula III are useful as insecticides, e.g. against house flies and flour beetles, as well as fungicides, e.g. against fusarium, Helminthosporium, Verticillium, C. ulmi and Coll. obic. and as nematocides. The compounds of Formula III are also useful to defoliate and desiccate cotton and other plants.

As starting sulfenyl halides for preparing the compounds of the present invention there are employed 1,2,2-trichloroethyl sulfenyl chloride, 2,2,2-trichloroethyl sulfenyl chloride, 1,2-dichlorovinyl sulfenyl chloride, 2,2-dichlorovinyl sulfenyl chloride, 1,2,2-tribromoethyl sulfenyl chloride and 2,2,2-tribromoethyl sulfenyl bromide.

As the reactant having the formula $R_2OPX_2$ there can be employed ethyl phosphorous dichloride, methyl phosphorous dichloride, ethyl phosphorous dibromide, propyl phosphorous dichloride, butyl phosphorus dichloride, t-butyl phosphorous dichloride, rexyl phosphorous dichloride, octyl phosphorous dichloride, octadecyl phosphorous dichloride.

Examples of compounds within the present invention are 1,2,2-trichloroethyl sulfenyl phosphoryl dichloride, 1,2,2-trichloroethyl sulfinyl phosphoryl dichloride, 2,2,2-trichlorethyl sulfenyl phosphoryl dichloride, 2,2,2-trichloroethyl sulfinyl phosphoryl dichloride, 2,2-dichorovinyl sulfenyl phosphoryl dichloride, 2,2-dichlorovinyl sulfinyl phosphoryl dichloride, 1,2-dichlorovinyl sulfenyl phosphoryl dichloride, 1,2-dichlorovinyl sulfinyl phosphoryl chloride, 1,2,2-tribromoethyl sulfenyl phosphoryl dibromide, 2,2,2-tribromoethyl sulfinyl phosphoryl dibromide, 2,2-dibromovinyl sulfenyl phosphoryl dibromide.

Compounds having Formula II can be prepared by reacting the appropriate alcohol or phenol in a 2 to 1 mole ratio with a compound having Formula I. Examples of such alcohols and phenols are methyl alcohol, ethyl alcohol, propyl alcohol, butyl alcohol, isobutyl alcohol, amyl alcohol, hexyl alcohol, phenol, p-cresol, m-cresol, o-cresol, xylenol, 2-chloroethyl alcohol, 3-chloropropyl alcohol, p-chlorophenol, m-chlorophenol, 4-nitrophenol, 4-methoxyphenol and cyclohexanol.

Examples of compounds within Formula II which can be prepared in the manner just described are O,O-dimethyl-S-(1,2,2-trichloroethyl) thiophosphate,
O,O-diethyl-S-(1,2,2-trichloroethyl) thiophosphate,
O,O-dibutyl-S-(1,2,2-trichloroethyl) thiophosphate,
O,O-dihexyl-S-(1,2,2-trichloroethyl) thiophosphate,
O,O,dicyclohexyl-S-(1,2,2-trichloroethyl) thiophosphate,
O,O-di-2-ethylhexyl-S-(1,2,2-trichloroethyl) thiophosphate,
O,O-dimethyl-S-(2,2,2-trichloroethyl) thiophosphate,
O,O-diethyl-S-(2,2,2-trichloroethyl) thiophosphate,
O,O-dibutyl-S-(2,2,2-trichloroethyl) thiophosphate,
O,O-dimethyl-S-(2,2-dichlorovinyl) thiophosphate,
O,O-diethyl-S-(2,2-dichlorovinyl) thiophosphate,
O,O-dibutyl-S-(2,2-dichlorovinyl) thiophosphate,
O,O-dipropyl-S-(2,2-dichlorovinyl) thiophosphate,
O,O-dipropyl-S-(1,2,2-trichloroethyl) thiophosphate,
O,O-dipropyl-S-(2,2,2-trichlorethyl) thiophosphate,
O,O-diisopropyl-S-(2,2-dichlorovinyl) thiophosphate,
O,O-diisopropyl-S-(2,2,2-trichloroethyl) thiophosphate,
O,O-di(2-chlorethyl) - S- ( 2,2,2-trichloroethyl) thiophosphate,
O,O - di(3-chloropropyl)-S-(2,2-dichlorovinyl) thiophosphate,
O,O-diphenyl-S-(2,2-dichlorovinyl) thiophosphate,
O,O,diphenyl-S-(2,2,2-trichloroethyl) thiophosphate,
O,O-di-p-tolyl-S-(2,2-dichlorovinyl) thiophosphate,
O,O-di-o-tolyl-S-(1,2,2-trichloroethyl) thiophosphate,
O,O-di-xylyl-S-(2,2,2-trichloroethyl) thiophosphate,
O,O-di-p-chlorophenyl-S-(1,2,2-trichloroethyl) thiophosphate,
O,O-di-o-chlorophenyl - S - (2,2-dichlorovinyl) thiophosphate,
O,O-di-o-bromophenyl - S - (1,2,2-trichloroethyl thiophosphate,
O,O-di-2,4-dichlorophenyl - S - 2,2-dichlorovinyl thiophosphate,
O-methyl-O-ethyl-S-(2,2-dichlorovinyl) thiophosphate,
O,O-di-p-nitrophenyl - S - (2,2,2-trichloroethyl) thiophosphate,
O,O-di-m-nitrophenyl - S - (2,2-dichlorovinyl) thiophosphate,
O,O-di-p-methoxyphenyl - S - (1,2,2-trichloroethyl) thiophosphate,
O,O-di-methyl 1,2,2-trichloroethyl sulfoxy phosphate

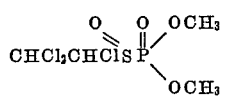

O,O-dimethyl 2,2,2-trichloroethyl sulfoxy phosphate,
O,O-dimethyl 1,2-dichlorovinyl sulfoxy phosphate,
O,O-dimethyl 2,2-dichlorovinyl sulfoxyphosphate,
O,O-di-butyl 1,2,2-trichloroethyl sulfoxy phosphate,
O,O-di-hexyl 2,2,2-trichloroethyl sulfoxy phosphate,
O,O-di-cyclohexyl 2,2-dichlorovinyl sulfoxy phosphate,
O,O-diphenyl 1,2-dichlorovinyl sulfoxy phosphate,
O,O-di-p-tolyl 1,2,2-trichloroethyl sulfoxyl phosphate,
O,O-di-m-chlorophenyl 2,2,2-trichloroethyl sulfoxy phosphate,
O,O-di-2-chloroethyl 1,2,2 - trichloroethyl sulfoxy phosphate,
O,O-di-m-nitrophenyl 2,2-dichlorovinyl sulfoxy phosphate,
O,O-di-p-methoxyphenyl 1,2-dichlorovinyl sulfoxy phosphate.

Compounds having Formula III can be prepared by reacting the appropriate mercaptan or thiophenol in a 2 to 1 mole ratio with a compound having Formula I. Examples of such mercaptans are methyl mercaptan, ethyl mercaptan, butyl mercaptan, hexyl mercaptan, lauryl mercaptan, cyclohexyl mercaptan, thiophenol, o-thiocresol, m-thiocresol, 2-chloroethyl mercaptan, p-nitro thiophenol, m-methoxy thiophenol, o-chloro thiophenol.

Examples of compounds within Formula III are

S,S-dimethyl-S-1,2,2-trichloroethyl trithiophosphate,
S,S-diethyl-S-1,2,2-trichloroethyl trithiophosphate,
S,S-di-(2-chloroethyl)-S-1,2,2 - trichloroethyl trithiophosphate,
S,S-dibutyl-S-1,2,2-trichloroethyl trithiophosphate,
S,S-diphenyl-S-1,2,2-trichloroethyl trithiophosphate,
S,S-di-p-chlorophenyl-S-1,2,2 - trichloroethyl trithiophosphate,
S,S-di-p-tolyl-S-1,2,2-trichloroethyl trithiophosphate,
S,S-dimethyl-S-2,2,2-trichloroethyl trithiophosphate,
S,S-diethyl-S-2,2,2-trichloroethyl trithiophosphate,
S-S-ethylene-(1,2)-S-2,2,2-trichloroethyl trithiophosphate (made from one mole of S-2,2,2-trichloroethyl sulfenyl phosphoryl dichloride and one mole of 1,2-ethanedithiol),
S,S-diisopropyl-S-2,2,2-trichloroethyl trithiophosphate,
S,S-diphenyl-S-2,2,2-trichloroethyl trithiophosphate,
S,S-di-p-chlorophenyl-S-2,2,2 - trichloroethyl trithiophosphate,
S,S-di-p-tolyl-S-2,2,2-trichloroethyl trithiophosphate,
S,S-dimethyl-S-2,2-dichlorovinyl trithiophosphate,
S,S-diethyl-S-2,2-dichlorovinyl trithiophosphate,
S,S-2,2-di-(2-chloroethyl)-S-2,2-dichlorovinyl trithiophosphate,
S,S-diisopropyl-S-2,2-dichlorovinyl trithiophosphate,
S,S-dibutyl-S-2,2-dichlorovinyl trithiophosphate,
S,S-di-t-butyl-S-2,2-dichlorovinyl trithiophosphate,
S,S-di-p-chlorophenyl - S - 2,2-dichlorovinyl trithiophosphate,
S,S-di-p-tolyl-S-2,2-dichlorovinyl trithiophosphate,
S,S-dimethyl 1,2,2-trichloroethyl sufoxy phosphate

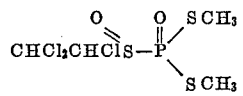

S,S-dimethyl 2,2,2-trichloroethyl sulfoxy phosphate,
S,S-dimethyl 2,2-dichlorovinyl sulfoxy phosphate.

Unless otherwise indicated, all parts and percentages are by weight.

EXAMPLE 1

276 grams (6.0 moles) of absolute ethyl alcohol were cooled to −15° C. and 825 grams of PCl$_3$ (6.0 moles+a slight excess) were added dropwise with stirring at −10 to −15° C. over a period of 6 hours. Standing overnight at room temperature and fractional distillation under slightly reduced pressure gave 585 grams (65% yield) of mono ethyl phosphorous dichloride, EtOPCl$_2$, B.P.$_{150}$ 55° C., $n_D^{25}$ 1.4651.

EXAMPLE 2

26 grams (0.177 mole) of EtOPCl$_2$ were diluted with 150 ml. of dry carbon tetrachloride and 35 grams (0.177 mole) of 1,2,2-trichloroethyl sulfenyl chloride were added dropwise with stirring at 30–32° C. (occasional cooling) over a period of 30 minutes. The reaction was rapid as demonstrated by the almost immediate decoloration of the sulfenyl chloride. Standing of the reaction mixture overnight at room temperature, removing all volatiles under reduced pressure and high vacuum distillation gave 39 grams (78% yield) of 1,2,2-trichloroethyl sulfenyl phosphoryl dichloride (CP 50) as a colorless liquid B.P.$_{0.02}$ 75° C.; $n_D^{25}$ 1.5565; percent Cl, 61.9; percent S, 11.3; percent P, 10.6

EXAMPLE 3

8.43 grams (0.03 mole) of CP 50 were diluted with 100 ml. of petroleum ether and 2.5 grams (0.078 mole) of dry methanol were added in portions in order to allow the reaction to proceed at a controllable rate. The HCl-evolution was moderate at room temperature and the whole mixture was allowed to stand overnight. Finally 2 more ml. of methanol were added at once and stirring was continued for 30 minutes. The whole mixture was then freed from all volatile material and treated in high vacuum.

8.0 grams (99% yield) of a heavy almost colorless oil were obtained. Washing of this material with dilute sodium bicarbonate and water, drying over dry magnesium sulfate (in chloroform as solvent) and stripping in high vacuum gave 6.5 grams (80% yield) of pure O,O-dimethyl-S-1,2,2-trichloroethyl phosphate, $n_D^{25}$ 1.5095. (This compound has the formula

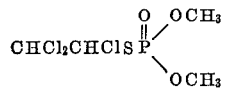

and is called O,O-dimethyl-S-(1,2,2-trichloroethyl) thiophosphate in Hensel et al. Patent No. 3,184,377, Example 9.)

EXAMPLE 4

13.0 grams (0.046 mole) of CP 50 were dissolved in 150 ml. of Skellysolve B (aliphatic petroleum hydrocarbon solvent boiling in the hexane range) and 4.5 grams (0.092 mole plus a slight excess) of methyl mercaptan were introduced at 0–10° C. (ice water bath). 9.2 grams of triethyl amine (0.092 mole) were then added with stirring and cooling at 25–30° C. Further stirring, washing in succession with water, dilute HCl, dilute NaHCO₃ and water, drying over anhydrous MgSO₄ and high vacuum evaporation gave 8.5 grams (60% yield) of S,S-dimethyl-S-1,2,2-trichloroethyl phosphate (also called S,S-dimethyl-S-1,2,2-trichloroethyl trithiophosphate,

as a brown oil, $n_D^{25}$ 1.6178; percent S, 31.0; percent P, 10.0). It was purified by distillation at 129–130° C. at 0.02 mm. Hg and had an $n_D^{25}$ 1.6205. The product was useful as a fungicide, nematocide, defoliant, desiccant, as a post emergent herbicide and as an insecticide against the flour beetle and housefly.

EXAMPLE 5

To 5 grams (0.053 mole) of CP 50 in 150 ml. of dry petroleum ether 6.6 grams (0.106 mole) of ethyl mercaptan were added at 10° C. followed by dropwise addition of 10.6 grams (0.106 mole) of triethyl amine with stirring and cooling at 10–15° C. Standing overnight at room temperature, washing in succession with sodium bicarbonate and water, drying over anhydrous MgSO₄ and stripping gave 11.8 grams (67% yield) of S,S-diethyl-S-1,2,2-trichloroethyl phosphate as a light brown oil, $n_D^{25}$ 1.5770. This product had the same uses as the product of Example 4.

EXAMPLE 6

To 8.46 grams (0.03 mole) of CP 50 in 150 ml. of petroleum ether were added 7.86 grams (0.06 mole) of 2,2-dichloroethyl mercaptan at 15° C. Then 6.06 grams (0.06 mole) of triethyl amine in 10 ml. of petroleum ether were added dropwise with stirring and cooling at or below 25° C. The conversion was fast and complete after one further hour's standing at room temperature. Washing of the resulting mixture in succession with water, dilute HCl, dilute NaHCO₃ and water, drying of the organic layer over anhydrous MgSO₄ and high vacuum stripping gave 10 grams (70% yield) of S,S-di(-2,2-dichloroethyl)-S-1,2,2-trichloroethyl phosphate. This product had the same uses as the product of Example 4.

EXAMPLE 7

11.25 grams (0.04 mole) of CP 50 were dissolved in 150 ml. of dry petroleum ether and 7.2 grams (0.08 mole) of butyl mercaptan were added dropwise with stirring at 5–10° C.; 8.2 grams (0.08 mole) of triethyl amine in 20 ml. of petroleum ether were then added dropwise with stirring and cooling (ice-water bath) at below 25° C. Stirring one additional hour at room temperature and standing overnight gave after washing with water, dilute HCl and dilute NaHCO₃, drying with MgSO₄ and high vacuum stripping 12.5 grams (81% yield) of S,S-di-n-butyl-S-1,2,2-trichloroethyl phosphate as a light orange oil which was found to contain 10–15% of di-butyl disulfide as an impurity. Distillation gave the pure product as a yellow oil, B.P.$_{0.06}$ 160–165° C., $n_D^{25}$ 1.5572. The distilled yield was 70% of the crude or 57% overall.

The product of Example 7 was useful as a fungicide, defoliant, desiccant, post emergent herbicide and insecticide (against the flour beetle and housefly).

EXAMPLE 8

11.6 grams (0.105 mole) of thiophenol were added to a solution of 15 grams (0.053 mole) of CP 50 in 150 ml. of dry petroleum ether followed by dropwise addition with stirring and cooling of 10.7 grams (0.106 mole) of triethyl amine in 10 ml. of petroleum ether at 0–5° C. over a period of 30 minutes. Three hours stirring at room temperature, washing with dilute sodium bicarbonate, drying with magnesium sulfate and stripping gave 19.1 grams (84% yield) of S,S-diphenyl-S-1,2,2-trichloroethyl phosphate as a bright yellow oil, $n_D^{25}$ 1.6516. The product of Example 8 was useful as a fungicide, defoliant and desiccant.

EXAMPLE 9

To 11.28 grams (0.04 mole) of CP 50 dissolved in 200 ml. of petroleum ether there were added 11.5 grams (0.079 mole) of p-chlorothiophenol in 50 ml. of benzene followed by dropwise addition of 8.2 grams (0.08 mole) of triethylamine with stirring at below 25° C. over a period of 30 minutes. Heating to 45–50° C. for a further 30 minutes and washing the mixture with water dilute HCl, dilute NaHCO₃ and again with water followed by drying over MgSO₄ and vacuum stripping gave 16.0 grams (81% yield) of S,S-di-p-chlorophenyl-S-1,2,2-trichloroethyl phosphate as a heavy brown oil, $n_D^{25}$ 1.6554. The product of Example 9 was useful as a fungicide and post emergent herbicide.

EXAMPLE 10

9.92 grams (0.08 mole) of p-toluene thiol in 50 ml. of benzene were added to a solution of 11.28 grams (0.04 mole) of CP 50 in 200 ml. of petroleum ether with stirring followed by dropwise addition of 8.2 grams (0.08 mole) of triethyl amine in 20 ml. of petroleum ether with stirring and cooling at below 25° C. Warming for 1 hour to 45–50° C. and standing overnight gave after washing with dilute HCl, dilute NaHCO₃ and water, drying over MgSO₄ and stripping 5.17 grams (86% yield) of S,S-di-p-tolyl-S-1,2,2-trichloroethyl phosphate as a light brown heavy oil $n_D^{25}$ 1.6400. The product of Example 10 was useful as a fungicide and insecticide (against the flour beetle and housefly).

EXAMPLE 11

16 grams (0.109 mole) of EtOPCl₂ were diluted with 100 ml. of dry carbon tetrachloride and 17 grams (0.085 mole) of 2,2,2-trichloroethyl sulfenyl chloride were added dropwise with stirring and occasional cooling at 25–30° C. over a period of 30 minutes. Stirring the mixture at room temperature for three further hours and fractionating, finally in high vacuum gave 23 grams (95% yield) of 2,2,2-trichloroethyl sulfenyl phosphoryl dichloride (CP 51) as a colorless liquid, B.P.$_{0.05}$ 75–76° C., $n_D^{25}$ 1.5500.

EXAMPLE 12

To 7 grams (0.0248 mole) of CP 51 in 150 ml. of petroleum ether were added 3.0 grams (0.05 mole) of methanol dropwise at 20° C. 5 grams (0.05 mole) of triethyl amine in 10 ml. of petroleum ether were added dropwise with cooling in order to complete the reaction in a short period of time. Washing with water, dilute HCl, dilute NaHCO$_3$ and water, drying over anhydrous MgSO$_4$ and high vacuum stripping gave 6.2 grams (92% yield) of O,O-dimethyl-S-2,2,2-trichloroethyl phosphate (called O,O-dimethyl-S-(2,2,2-trichloroethyl) thiophosphate in Hensel et al. Patent 3,184,317, Example 13) as a light brown oil which was distilled to obtain the product as a colorless liquid, B.P.$_{0.04}$ 100–102° C., $n_D^{25}$ 1.5070.

EXAMPLE 13

2.88 grams (0.06 mole) of methyl mercaptan were introduced into a solution of 8.46 grams (0.03 mole) of CP 51 followed by dropwise addition of 6.06 grams (0.06 mole) of triethyl amine at 25–30° C. with stirring and cooling over a period of 30 minutes. In order to offset any losses of methyl mercaptan, 0.6 gram more of methyl mercaptan were introduced and the mixture was allowed to stand for a further two hours at room temperature. Washing with water, dilute HCl, dilute NaHCO$_3$ and water, drying over MgSO$_4$ and high vacuum stripping gave 8.7 grams (95% yield) of S,S-dimethyl-S-2,2,2-trichloroethyl phosphate as a light orange oil, $n_D^{25}$ 1.6038. The product of Example 13 was useful as a fungicide, nematocide, postemergent herbicide, defoliant, desiccant and insecticide.

EXAMPLE 14

To 7.0 grams (0.024 mole) of CP 51 in 150 ml. of Skellysolve B there were added 3.1 grams (0.05 mole) of ethyl mercaptan with cooling followed by dropwise addition of 5.0 grams (approximately 0.05 mole) of triethyl amine in 10 ml. of Skellysolve B at 10–15° C. One hour's stirring at room temperature, washing with water, dilute HCl, dilute NaHCO$_3$ and water, drying over MgSO$_4$ and high vacuum stripping gave S,S-diethyl-S-2,2,2-trichloroethyl phosphate as a colorless oil, $n_D^{25}$ 1.5736. The product was useful in the same manner as the product of Example 13.

EXAMPLE 15

3.8 grams (0.04 mole) of 1,2-ethylene dithiol were added to a solution of 11.3 grams (0.04 mole) of CP 51 in 200 ml. of petroleum ether followed by dropwise addition of 8.2 grams (0.08 mole) of triethyl amine in 20 ml. of petroleum ether with stirring and cooling at 10° C., stirring for 30 minutes at 40–45° C. and for 1 hour at room temperature gave after washing with water, dilute HCl, dilute NaHCO$_3$, drying over MgSO$_4$ and vacuum stripping 7.5 grams (61% yield) of S,S-ethylene (1,2-S-2,2,2-trichloroethyl phosphate of the formula

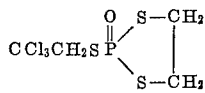

as a heavy colorless oil. It was useful as a fungicide, nematocide, post-emergent herbicide, desiccant and insecticide against houseflies.

EXAMPLE 16

8.05 grams (0.106 mole) of isopropyl mercaptan were added to 15 grams (0.053 mole) of CP 51 in 150 ml. of dry petroleum ether. 10.6 grams (0.106 mole) of triethyl amine were then added dropwise with stirring and cooling at 0–5° C. over a period of 0.5 hour. Stirring for 3 hours at room temperature and working up as before (washing, drying and stripping) gave 15.1 grams (78% yield) of S,S-diisopropyl-S-2,2,2-trichloroethyl phosphate as an almost colorless heavy oil, $n_D^{25}$ 1.5627. The product of Example 16 was useful as a fungicide, nematocide, defoliant and desiccant.

EXAMPLE 17

8.8 grams (0.08 mole) of thiophenol were added to 11.3 grams (0.04 mole) of CP 51 in 150 ml. of dry petroleum ether followed by addition of 8.2 grams (0.08 mole) of triethyl amine with stirring and cooling at approximately 25° C. After warming for one additional hour 40–45° C. the mixture was washed with water, dilute HCl, dilute NaHCO$_3$ and water, dried over MgSO$_4$ and vacuum stripped. There were obtained 13.5 grams (78% yield) of S,S-diphenyl-S-2,2,2-trichloroethyl phosphate as a light yellow oil containing some diphenyl disulfide as an impurity, $n_D^{28}$ 1.6555. Stripping in high vacuum gave the purified product having an $n_D^{25}$ 1.6495. The product was useful as a fungicide, nematocide, post emergent herbicide, desiccant and insecticide against houseflies.

EXAMPLE 18

11.5 grams (0.08 mole) of p-chlorothiophenol were added to 11.3 grams (0.04 mole) of CP 51 dissolved in 200 ml. of petroleum ether and reacted with 8.2 grams (0.08 mole) of triethylamine as before to give after washing, drying, and stripping 16.5 grams (83% yield) of S,S-di-p-chlorophenyl-S - 1,2,2-trichloroethyl phosphate as a heavy yellow oil, $n_D^{25}$ 1.6680. The product was useful as a fungicide, nematocide, post emergent herbicide, desiccant and insecticide against the flour beetle.

EXAMPLE 19

To 15.0 grams (0.053 mole) of CP 51 in 150 ml. of dry petroleum ether were added 13.1 grams (0.106 mole) of p-thio cresol followed by 10.6 grams (0.106 mole) of triethyl amine which was added dropwise with stirring and cooling at 0–5° C. over a period of 1 hour. Continued stirring at room temperature for 3 hours, washing, drying and stripping of the organic mixture as described above gave 23 grams (95% yield) of S,S-di-p-tolyl-S-2,2,2-trichloroethyl phosphate as a light yellow oil, $n_D^{25}$ 1.6382. The product was useful as a fungicide, nematocide, pre-emergent herbicide, post-emergent herbicide, defoliant, desiccant and insecticide against flour beetles.

EXAMPLE 20

12.0 grams (0.073 mole) of 2,2-dichlorovinyl sulfenyl chloride were added dropwise with stirring at 15–20° C. to a solution of 11 grams (0.08 mole) of EtOPOCl$_2$ in 50 cc. of dry carbon tetrachloride. The red sulfenyl chloride color disappeared instantly and a light yellow solution was formed. When the solution was allowed to obtain room temperature (25–30° C.) the yellow color soon disappeared forming a completely colorless solution. After removing the solvent, distillation in vacuum gave 12.0 grams (67% yield) of 2,2-dichlorovinyl sulfenyl phosphoryl dichloride (CP 52) as a colorless liquid, B.P.$_{0.12}$ 60–65° C., $n_D^{22}$ 1.5711.

In preparing CP 52 preferably the 2,2-dichlorovinyl sulfenyl chloride is purified by flash distillation in high vacuum immediately before use. When CP 52 is employed as an intermediate in preparing esters it is preferably distilled before use in order to remove small amounts (up to 10%) of saturated impurities (mainly CP 51) which have considerably higher boiling points.

EXAMPLE 21

To 9.84 grams (0.04 mole) of CP 52 in 100 ml. of dry petroleum ether there were added approximately 3.0 grams (0.094 mole) of dry methanol dropwise with stirring over a period of 15 minutes. Almost instantaneously at room temperature HCl evolution started and proceeded for approximately 1 hour at 30° C. After standing overnight and direct removal of all volatile matter in a high vacuum there were obtained 9.7 grams (quantitative yield) of O,O-dimethyl-S-2,2 - dichlorovinyl phosphate (called O,O-dimethyl-S-(2,2-dichlorovinyl) thiophosphate in Hensel et al. Patent 3,184,317, Example 5) as an almost colorless liquid, $n_D^{25}$ 1.5145.

EXAMPLE 22

To a mixture of 7.38 grams (0.03 mole) of CP 52 and 9.78 grams (0.06 mole) of 2,4-dichlorophenol in 150 ml.

of petroleum ether-benzene (1:1) 6.06 grams (0.06 mole) of triethyl amine were added dropwise with stirring at room temperature Without the use of triethyl amine (or other tertiary amine, e.g. pyridine, trimethyl amine tributyl amine, trioctyl amine, tri cyclohexyl amine) the system was almost unreactive. In contrast the rate of reaction in the presence of triethyl amine was of a high order and conversion was complete within about 1 hour. Washing in succession with dilute HCl, dilute NaHCO$_3$ and water, drying over anhydrous MgSO$_4$ and removing the solvent, finally in high vacuum, gave 14.5 grams (95% yield of O,O-di-2,4 - dichlorophenyl-S-2,2-dichlorovinyl phosphate as a brown heavy oil, $n_D^{25}$ 1.6021. The product was useful as a nematocide.

EXAMPLE 23

5 grams (over 0.10 mole) of methyl mercaptan were absorbed in a solution of 9.84 grams (0.04 mole) of CP 52 in 150 ml. of petroleum ether at 5–10° C. 8.08 grams (0.08 mole) of triethylamine were then added dropwise with stirring and cooling at 0–5° C. After stirring at room temperature for 3 hours the mixture was washed with water and dilute NaHCO$_3$, dried over anhydrous MgSO$_4$ and stripped in a high vacuum. 7.5 grams (70% yield) of crude S,S-dimethyl-S-2,2-dichlorovinyl phosphate were obtained as an almost colorless, mobile liquid, $n_D^{25}$ 1.6243, most of which distilled at B.P.$_{-0.04}$ 120–123° C. to give the pure product $n_D^{26}$ 1.6303. The product was useful as a fungicide, nematocide, post-emergent herbicide, desiccant and insecticide (against flour beetle and houseflies).

EXAMPLE 24

6.6 grams (0.106 mole plus a slight excess) of ethyl mercaptan were added to 13 grams (0.053 mole) of CP 52 in 150 ml. of dry petroleum ether followed by dropwise addition of 10.6 grams (0.106 mole) of triethyl amine in 10 ml. of petroleum ether with stirring and cooling at 0–5° C. After stirring for 3 hours at room temperature, washing with water and dilute NaHCO$_3$, drying over MgSO$_4$ and stripping there were obtained 13.3 grams (85% yield) of crude S,S-diethyl-S-2,2-dichlorovinyl phosphate as an almost colorless oil, $n_D^{28}$ 1.5900, which was purified by distillation to give the final product having a B.P.$_{-0.08}$ 105–109° C., $n_D^{25}$ 1.6131. The product was useful as a fungicide, nematocide, post-emergent herbicide, defoliant, desiccant and insecticide (against flour beetles and houseflies).

EXAMPLE 25

8.2 grams (0.033 mole) of CP 52 were dissolved in 150 ml. of dry petroleum ether and 8.8 grams (0.066 mole) of 2,2-dichloroethyl mercaptan were added at room temperature. With stirring and cooling 6.6 grams (0.066 mole) of triethylamine in 10 ml. of dry petroleum ether were added dropwise at 5–10° C. over a period of 30 minutes. Heating for 15 minutes to 45° C. (gentle reflux) and 3 hours at room temperature were employed followed by washing with dilute HCl, dilute NaHCO$_3$ and water, drying over MgSO$_4$ and stripping in a vacuum. There were obtained 12.2 grams (85% yield) of crude S,S - di(2,2-dichloroethyl)-S-2,2-dichlorovinyl phosphate as a slightly yellow oil $n_D^{27}$ 1.6148. This was distilled to give the pure product B.P.$_{-0.1}$ 180° C., $n_D^{25}$ 1.6165. The product was useful as a fungicide, nematocide, post-emergent herbicide, defoliant, desiccant and insecticide (against flour beetles).

EXAMPLE 26

10.9 grams (0.08 mole) of propylthioethyl mercaptan were added to a solution of 9.83 grams (0.04 mole) of CP 52 in 150 ml. of dry petroleum ether and reacted by dropwise addition of 8.08 grams (0.08 mole) of triethyl amine in 10 ml. of petroleum ether with stirring and cooling at 25–30° C. to give after working up by washing, drying and stripping 16.8 grams (95% yield) of S,S-di-2-propylthioethyl-S-2,2-dichlorovinyl phosphate as a light yellow oil, $n_D^{25}$ 1.5945. The product was useful as a fungicide, nematocide, pre-emergent herbicide, post-emergent herbicide, defoliant, desiccant and insecticide (against flour beetles).

EXAMPLE 27

8.05 grams (0.106 mole) of isopropyl mercaptan were added to 13 grams (0.053 mole) of CP 52 in 150 ml. of dry petroleum ether at room temperature. 10.7 grams (0.106 mole) of triethyl amine in 10 ml. of petroleum ether were then added dropwise with stirring at 0–5° C. with external cooling and the resulting mixture was then stirred at room temperature for 3 hours. It was washed with dilute HCl, dilute NaHCO$_3$ and water and dried over MgSO$_4$ and stripped to give 14.2 grams (85% yield) of S,S-di-isopropyl-S-2,2-dichlorovinyl phosphate as an almost colorless oil, $n_D^{25}$ 1.5602. The product was useful as a fungicide, nematocide, preemergent herbicide, post-emergent herbicide, and desiccant.

EXAMPLE 28

6.5 grams (0.07 mole plus a small excess) of n-butyl mercaptan were mixed with 8.6 grams (0.035 mole) of CP 52 in 150 ml. of petroleum ether and 7.1 grams (0.07 mole) of triethyl amine in 10 ml. of petroleum ether were added dropwise with stirring and cooling at 5–10° C. Washing the obtained mixture with water, dilute HCl, dilute NaHCO$_3$, drying over anhydrous MgSO$_4$ and high vacuum stripping gave 10.0 grams (81% yield) of S,S-di-n-butyl-S-2,2-dichlorovinyl phosphate as an almost colorless oil, $n_D^{25}$ 1.5540 containing 5–10% of dibutyl disulfide as an impurity. The product was useful as a fungicide, post-emergent herbicide, desiccant and insecticide (against flour beetles and houseflies).

EXAMPLE 29

9.55 grams (0.106 mole) of t-butyl mercaptan were mixed with 13 grams (0.053 mole) of CP 52 in 150 ml. of dry petroleum ether and 10.6 grams (0.106 mole) of triethyl amine in 10 ml. of petroleum ether were added dropwise with stirring and cooling at 0–5° C. over a period of 30 minutes followed by stirring at room temperature for approximately 3 hours. Washing with dilute HCl, dilute NaHCO$_3$ and water, drying over MgSO$_4$ and vacuum stripping gave 15.5 grams (85% yield) of S,S-di-t-butyl-S-2,2-dichlorovinyl phosphate as an almost colorless oil, $n_D^{25}$ 1.5683. The product was useful as a fungicide, defoliant and desiccant.

EXAMPLE 30

8.67 grams (0.06 mole) of p-chlorothiophenol were mixed with 7.38 grams (0.035 mole) of CP 52 in 150 ml. of dry benzene and 6.06 grams (0.06 mole) of triethyl amine in 10 ml. of benzene were added dropwise with stirring and moderate cooling at 25–30° C. The resulting mixture was allowed to stand overnight at room temperature and was washed with dilute HCl, dilute NaHCO$_3$ and water, dried over MgSO$_4$ and high vacuum stripped to obtain 11.5 grams (83% yield) of S,S-di-p-chlorophenyl-S-2,2-dichlorovinyl phosphate as a light yellow heavy oil, $n_D^{26}$ 1.6692. The product was useful as a fungicide, nematocide, pre-emergent herbicide, post-emergent herbicide, desiccant and insecticide (against flour beetles and houseflies).

EXAMPLE 31

7.44 grams (0.06 mole) of p-thiocresol were mixed with 7.38 grams (0.03 mole) of CP 52 in 150 ml. of dry benzene and 6.06 grams (0.06 mole) of triethyl amine in 10 ml. of benzene were added dropwise with stirring at 25–30° C. with moderate cooling. After standing at room temperature overnight, washing, drying and stripping in the manner described there were obtained 11.5 grams (91% yield) of S,S-di-p-tolyl-S-2,2-dichlorovinyl phosphate as an almost colorless oil, $n_D^{25}$ 1.6600. The product was useful as a fungicide, nematocide, post-emergent herbicide and desiccant.

EXAMPLE 32

10 grams (0.0355 mole) of CP 50 were dissolved in 200 ml. of dry chloroform and after cooling to 5° C. a moderate ozone stream was passed through the solution, maintaining a temperature of 5–15° C. The ozone concentration was 82.5 mg./liter oxygen and the rate of passage was at a velocity of 0.56 liter/min. For the given amount and gas velocity a period of 36.6 minutes would theoretically have been sufficient to oxidize the CP 50. A period of 4 hours (6.5 times theoretical) was found necessary to complete the reaction to form 1,2,2-tri-chloroethyl-sulfinyl phosphoryl dichloride (CP 60) in an amount of 10 grams (95% yield) as a heavy oil, $n_D^{25}$ 1.5285. CP 60 was found to be unstable to distillation and hence should not be distilled.

EXAMPLE 33

5 grams of CP 50 were oxidized in 90 ml. of dry chloroform by passing a dry ozone stream through the solution at 5–15° C. for 4 hours. The ozone concentration was the same as that in Example 32.

To the chloroform solution of CP 60 thus obtained there were added 1.5 grams (0.047 mole, an excess) of dry methanol followed by 3.6 grams (0.0354 mole) of triethyl amine to bind free HCl. The mixture was stirred 1 hour at room temperature, washed with water, dilute HCl and again with water, dried over anhydrous MgSO₄ and stripped in a high vacuum to give 4 grams (85% yield) of O,O-dimethyl - S - 1,2,2 - trichloroethylsulfoxy phosphate

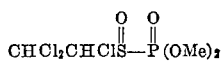

(Compound 5717) as a brownish liquid, $n_D^{25}$ 1.5050. This product was useful as a nematocide and insecticide (e.g. against flies and flour beetles). It was also useful as a fungicide being particularly effective against Dutch elm disease causing *C. ulmi* and *Coll. obic.* on cucumber leaves.

EXAMPLE 34

10 grams (0.0355 mole) of CP 51 were dissolved in 200 ml. of dry chloroform, cooled to 10° C. and an oxygen stream containing 82.5 mg. ozone/liter was introduced at a velocity of 0.56 liter/minute. Dispersion of the gas stream in the liquid was effected by rapid stirring. After a period of 2 hours the product was stripped in high vacuum to give 10 grams (95% yield) of 2,2,2-trichloroethyl sulfinyl phosphoryl chloride (CP 61) as the residue as a colorless liquid $n_D^{25}$ 1.5335. When an attempt was made to distill the product it was observed that there was significant decomposition.

EXAMPLE 35

5 grams (0.017 mole) of CP 51 in 75 ml. of dry chloroform were oxidized using an 82.5 mg./l. ozone in oxygen stream at a velocity of 0.56 l./min. for 2 hours until the 9.8μ IR-absorption was at a maximum.

To this solution there were added 5 grams (0.156 mole, 4–5 times the required amount) of dry methanol dropwise at 15–20° C. Finally in order to bind all of the free HCl formed there were added 3.5 grams (0.035 mole) of triethyl amine and the whole mixture was stirred for 1 hour at room temperature. Washing of the resulting mixture in succession with dilute HCl, dilute NaHCO₃ and water, drying the chloroform layer over anhydrous MgSO₄ and high vacuum stripping gave 5.0 grams (98% yield) of O,O-dimethyl-S-2,2,2-trichloroethylsulfoxy phosphate (Compound 5777) as a colorless oil, $n_D^{25}$ 1.5260. The product was useful as a fungicide, being particularly effective against Dutch elm disease causing *C. ulmi* and *Coll. obic.* on cucumber leaves.

EXAMPLE 36

The preparation of unsaturated sulfinyl phosphoryl dichlorides by direct oxidation of the corresponding sulfenyl phosphoryl dichloride with ozone containing oxygen was unsuccessful.

The dehydrochlorination of the corresponding trichloroethyl sulfinyl phosphoryl dichloride using 1 mole of tertiary amine per mole of phosphoryl dichloride also was unsuccessful. In order to force dehydrochlorination with a tertiary base, it was found that at least 3 mole equivalents of tertiary base were required per mole equivalent of phosphoryl dichloride. Excess tertiary base could be used, e.g. 4 or 5 mole equivalents, but this is somewhat wasteful. Any of the tertiary bases previously set forth in the present specification can be used. The desired product was then formed by adding 2 mole equivalents of HCl. The overall equation is believed to be according to the following illustration.

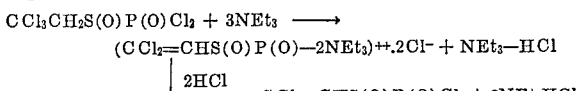

10 grams (0.0335 mole) of CP 61 were dissolved in 100 ml. of dry chloroform and dehydrochlorinated by dropwise addition of 10 grams (0.1 mole) of triethyl amine at 15° C. with stirring and cooling. The formed complex suspension was stirred for 3 hours at room temperature. Two equivalents of dry HCl gas were then introduced at 25° C. with cooling. The combined solids were removed by filtration and the filtrate evaporated in high vacuum. 8.8 grams (quantitative yield) of 2,2-dichlorovinyl sulfinyl phosphoryl dichloride (CP 62) were obtained as a dark liquid, $n_D^{25}$ 1.5365.

EXAMPLE 37

10.5 grams (0.0335 mole) of CP 61 were dissolved in 100 ml. of petroleum ether and 10 grams (0.1 mole) of triethyl amine were added dropwise with stirring and cooling at 15° C. Stirring was continued for 2 hours at room temperature. After standing overnight, the mixture turned brown.

2.1 grams (0.067 mole) of methanol were added dropwise to the solution of CP 62 thus formed at a temperature of 30° C. and allowed to stand at room temperature for a further 2 hours. Washing with dilute HCl, dilute NaHCO₃ and water, drying over MgSO₄ and high vacuum stripping gave 4.1 grams (47% yield) of a dark liquid $n_D^{25}$ 1.5112 which was primarily O,O-dimethyl-S-2,2-dichlorovinylsulfoxy phosphate (Compound 5721). This product was useful as a fungicide, pre-emergent herbicide and insecticide against flies and flour beetles.

EXAMPLE 38

There was added dropwise to 10 grams (0.0335 mole) of CP 60 in 100 ml. of dry chloroform, 10 grams (0.1 mole) of triethyl amine with stirring and cooling at 15° C. After a further stirring period at room temperature 2 equivalents of dry HCl gas were introduced. The triethyl amine hydrochloride formed was filtered off and the chloroform solution evaporated finally in high vacuum. 7.1 grams (81% yield) of 1,2-dichlorovinyl sulfinyl phosphoryl dichloride (CP 63) were obtained as a dark liquid, $n_D^{25}$ 1.5340.

EXAMPLE 39

To 10 grams (0.0335 mole) of CP 60, dissolved in 100 ml. of dry chloroform there were added dropwise with stirring and cooling at 15° C. 10 grams (0.1 mole) of triethyl amine. A suspension of the bis-ammonium complex mixed with triethyl amine hydrochloride in chloroform was formed and allowed to stand overnight to form CP 63 in situ. To this mixture there were then added 2.1 grams (0.067 mole) of methanol at approximately 30° C. and the mixture was stirred at room temperature for two hours. Washing with dilute HCl and dilute NaHCO₃, drying over MgSO₄ and stripping gave 4.0 grams (46% yield) of O,O-dimethyl-S-1,2-dichlorovinylsulfoxy phosphate (Compound 5720) as a dark brown oil, $n_D^{25}$ 1.4915.

The pesticides of the present invention can be used alone or they can be applied together with inert solids to form dusts, or can be suspended in a suitable liquid dilute, e.g. organic solvents or water.

There can also be added surface active agents or wetting agents and/or inert solids in the liquid formulations. In such case, the active ingredient can be from 0.01 to 95% by weight of the entire composition.

As organic solvents there can be employed hydrocarbons, e.g. benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chlorform, trichloroethylene, and perchloroethylene, esters such as ethyl acetate, amyl acetate and butyl acetate, ethers, e.g. ethylene glycol monomethyl ether and diethylene glycol monomethyl ether, alcohols, e.g. methanol, ethanol, isopropanol, amyl alcohol, ethylene glycol, propylene glycol, butyl carbitol acetate and glycerine. Mixtures of water and organic solvents, either as solutions or emulsions, can be employed. Since the phosphoryl dichlorides are hydrolyzed in water it is not one of the preferred diluents.

The novel pesticides can also be applied as aerosols, e.g. by dispersing them in air by means of a compressed gas such as dichlorodifluoromethane or trichlorofluoromethane and other Freons and Genetrons, for example.

The pesticides of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts. alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g. p-isooctylphenol condensed with 10 ethylene oxide units, soaps, e.g. sodium stearate and potassium oleate, sodium salt of propylnaphthalene sulfonic acid, di (2-ethylhexyl) ester of sodium sulfosuccinic acid, sodium lauryl sulfate, sodium decane sulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of atty acids and rosin acids, e.g. Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g. Pluronic 61 (molecular weight 1000), polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. The compounds of the present invention can be applied to soil, growing plants, e.g. trees, cotton plants, wheat and other grain plants, vegetable plants, seeds, fabrics, etc. to give pesticidal protection.

EXAMPLE 40

The compounds of the present invention were tested as saprophytic nematocides in water as a medium with Panagrellus and Rhabditis spp. at room temperature. The results were recorded as percent kill after a four days' incubation period in Table 1. The blank mortality was 5 to 10% kill.

TABLE 1

| Compound | Percent kill at rates of— | | |
|---|---|---|---|
| | 400 p.p.m. | 50 p.p.m. | 25 p.p.m. |
| CP 50 | 100 | 100 | 50 |
| CP 51 | 100 | 100 | 80 |
| CP 52 | 100 | 80 | 50 |
| CP 60 | 100 | 10 | 10 |
| CP 61 | 100 | 100 | 100 |

The compounds of the present invention were also tested as fungicides in plate fungicide tests. The compounds were added to agar cultures of the fungi. In Table 2 the number 10 indicates 100% effectiveness and 0 indicates no effectiveness. In Table 2 CU stands for *C. ulmi*; CO stands for *Coll. obic.*, F stands for Fusarium, H stands for Helminthosporium, R stands for Rhizoctonia and V stands for Verticillium. The concentrations are expressed in p.p.m.

TABLE 2

| Compound | CU | | | CO | | | F | | | H | | | R | | | V | | |
|---|---|---|---|---|---|---|---|---|---|---|---|---|---|---|---|---|---|---|
| | 500 | 100 | 10 | 500 | 100 | 10 | 500 | 100 | 10 | 500 | 100 | 10 | 500 | 100 | 10 | 500 | 100 | 10 |
| CP 50 | 10 | 5 | 5 | 10 | 10 | 0 | 10 | 0 | 0 | 10 | 0 | 0 | 10 | 5 | 0 | 10 | 10 | 0 |
| CP 51 | 10 | 5 | 5 | 10 | 10 | 0 | 10 | 10 | 0 | 10 | 0 | 0 | 10 | 10 | 0 | 10 | 10 | 0 |
| CP 52 | 10 | 8 | 0 | 10 | 10 | 0 | 10 | 10 | 0 | 10 | 0 | 0 | 10 | 10 | 0 | 10 | 10 | 10 |
| CP 60 | 10 | 5 | 0 | 10 | 0 | 0 | 10 | 0 | 0 | 10 | 0 | 0 | 10 | 5 | 0 | 10 | 10 | 0 |
| CP 61 | 10 | 5 | 0 | 10 | 0 | 0 | 10 | 0 | 0 | 5 | 0 | 0 | 10 | 0 | 0 | 10 | 10 | 10 |

EXAMPLE 41

Compounds 5717 and 5777 were also tested as saprophytic nematocides in the manner described in Example 41 with the results indicated in Table 3.

TABLE 3

| Compound | Percent kill at rates of | | | |
|---|---|---|---|---|
| | 200 p.p.m. | 100 p.p.m. | 50 p.p.m. | 25 p.p.m. |
| 5717 | 80 | 50 | 30 | 5 |
| 5777 | 100 | 100 | 50 | 30 |

Compounds 5717 and 5777 were also tested as fungicides in plate fungicide tests against *C. ulmi* in the manner described in Example 41 and as foliar fungicides by application to cucumber leaves infested with *Coll. obic.* The concentrations in Table 4 are in p.p.m.

TABLE 4

| Compound | C. ulmi. | | | Coll. obic. | | |
|---|---|---|---|---|---|---|
| | 500 | 100 | 10 | 1,000 | 100 | 10 |
| 5717 | 10 | 5 | 0 | 10 | 10 | 10 |
| 5777 | 10 | 8 | 5 | 10 | 10 | 10 |

Compounds 5717, 5777, 5721 and 5720 were tested as insecticides against flies and flour beetles. In Table 5 the results are in percent kill after 2 hours and after 18 hours using the indicated concentrations of the compounds.

TABLE 5

| Compound | Fly (2/18 hours) | | | Flour beetle (2/18 hours) | | |
|---|---|---|---|---|---|---|
| | 1,000 | 100 | 10 | 1,000 | 100 | 10 |
| 5717 | 100/100 | 50/67 | 3/14 | 100/100 | 78/88 | 10/15 |
| 5777 | 100/100 | 100/100 | 30/97 | 100/100 | 78/100 | 6/100 |
| 5721 | 10/20 | 3/14 | 3/14 | 80/100 | 0/0 | 0/0 |
| 5720 | 100/100 | 47/98 | 0/3 | 100/100 | 84/100 | 0/20 |

We claim:
1. A compound having the formula

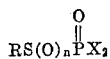

where R is selected from the group consisting of trihaloethyl and dihalovinyl, X is a halogen, all of the halogen atoms of the compound having an atomic weight of 35 to 80 and $n$ is an integer of the group consisting of 0 and 1.

2. A compound according to claim 1 wherein all halogen atoms are chlorine.

3. A compound according to claim 1 which is 1,2,2-trichloroethyl sulfenyl phosphoryl dichloride.

4. A compound according to claim 1 which is 2,2,2-trichloroethyl sulfenyl phosphoryl dichloride.

5. A compound according to claim 1 which is 1,2,2-trichloroethyl sulfinyl phosphoryl dichloride.

6. A compound according to claim 1 which is 2,2,2-tricholorethyl sulfinyl phosphoryl dichloride.

7. A compound according to claim 1 which is dichlorovinyl sulfenyl phosphoryl dichloride.

8. A compound according to claim 1 which is 2,2-dichlorovinyl sulfenyl phosphonyl dichloride.

9. A compound according to claim 1 which is 2,2-dichlorovinyl sulfinyl phosphoryl dichloride.

10. A compound according to claim 1 which is 1,2-dichlorovinyl sulfinyl phosphoryl dichloride.

11. A compound according to claim 1 wherein all of the halogen atoms are chlorine and $n$ is 0.

12. A compound according to claim 1 wherein all of the halogen atoms are chlorine and $n$ is 1.

References Cited

UNITED STATES PATENTS

| | | | |
|---|---|---|---|
| 2,947,773 | 8/1960 | Allen | 260—957 XR |
| 3,184,377 | 5/1965 | Hensel et al. | |
| 3,337,658 | 8/1967 | Senkbeil et al. | 260—960 |

OTHER REFERENCES

Gerrard et al., "Chemical Abstracts," vol. 49, 8093, (1955).

CHARLES B. PARKER, *Primary Examiner.*

A. H. SUTTO, *Assistant Examiner.*

U.S. Cl. X.R.

71—71, 87; 424—219, 221; 260—937, 951, 954, 957, 960, 964, 971, 973, 985, 986